US012326039B1

(12) United States Patent
Wu

(10) Patent No.: US 12,326,039 B1
(45) Date of Patent: Jun. 10, 2025

(54) MULTI-MODE UP-DOWN CURTAIN

(71) Applicants: Mingliang Wu, Fujian (CN); Siyu Wu, Fujian (CN)

(72) Inventor: Mingliang Wu, Fujian (CN)

(73) Assignees: Mingliang Wu, Xiamen (CN); Siyu Wu, Xiamen (CN)

( * ) Notice: Subject to any disclaimer, the term of this patent is extended or adjusted under 35 U.S.C. 154(b) by 0 days.

(21) Appl. No.: 18/896,942

(22) Filed: Sep. 26, 2024

(30) Foreign Application Priority Data

Sep. 2, 2024 (CN) ......................... 202422136748.6

(51) Int. Cl.
*E06B 9/42* (2006.01)
*E06B 9/24* (2006.01)
*E06B 9/40* (2006.01)

(52) U.S. Cl.
CPC ........ *E06B 9/42* (2013.01); *E06B 2009/2441* (2013.01); *E06B 2009/405* (2013.01)

(58) Field of Classification Search
CPC ........ E06B 9/40; E06B 9/42; E06B 2009/405; E06B 2009/2441; E06B 2009/2405; E06B 9/64; E06B 2009/135
See application file for complete search history.

(56) References Cited

U.S. PATENT DOCUMENTS

| | | | | |
|---|---|---|---|---|
| 1,805,941 A * | 5/1931 | Eveleth | E06B 9/58 | 160/255 |
| 1,833,140 A * | 11/1931 | Traut | E06B 9/13 | 160/264 |
| 2,094,299 A * | 9/1937 | McQuarrie | E06B 7/02 | 160/128 |
| 5,067,545 A * | 11/1991 | Wilkins | E06B 9/325 | 160/902 |
| 5,271,183 A * | 12/1993 | Hahn | E05F 15/665 | 49/73.1 |
| 10,947,781 B2 * | 3/2021 | Raggini | E06B 9/80 | |

(Continued)

FOREIGN PATENT DOCUMENTS

| | | |
|---|---|---|
| CN | 104420810 B | 3/2016 |
| CN | 216381164 U | 4/2022 |

OTHER PUBLICATIONS

Office Action Dated Mar. 21, 2025 for Corresponding Canada Patent Application No. 3,248,762.

*Primary Examiner* — Abe Massad

(57) ABSTRACT

A multi-mode up-down curtain includes a winding component, a cord fabric, an adjusting rod, a positioning element and a falling element. The winding component includes a support element and a roller rotatably mounted there on. The cord fabric is entirely or partially wound around the roller. The cord fabric includes a light-transmitting section and a light-tight section which are connected along a stretching direction of the cord fabric. The light-tight section is arranged in front of the light-transmitting section along the stretching direction. The adjusting rod is connected to the light-tight section, and the adjusting rod is spaced apart from the light-transmitting section along the stretching direction. The light-tight section is located between a junction and the falling element, while the light-transmitting section is located between a top edge of a window and the junction, therefore a part of outdoor natural light can enter a room.

13 Claims, 10 Drawing Sheets

(56) References Cited

U.S. PATENT DOCUMENTS

| | | | | |
|---|---|---|---|---|
| 2004/0250963 | A1 * | 12/2004 | Hsu | E06B 9/327<br>160/84.03 |
| 2015/0075726 | A1 * | 3/2015 | Byun | E06B 9/262<br>160/84.04 |
| 2016/0130869 | A1 * | 5/2016 | Cheng | E06B 9/40<br>160/309 |
| 2023/0193688 | A1 * | 6/2023 | Strand | E06B 9/322<br>160/84.02 |
| 2023/0193692 | A1 * | 6/2023 | Han | E05F 15/00<br>49/360 |

* cited by examiner

MULTI-MODE UP-DOWN CURTAIN

CROSS-REFERENCE TO RELATED APPLICATIONS

The present application claims priority of Chinese Utility Model Application No. 202422136748.6, filed on Sep. 2, 2024, the entire contents of which are hereby incorporated by reference.

TECHNICAL FIELD

The present disclosure relates to the field of window shading, and in particular to a multi-mode up-down curtain.

BACKGROUND

A window is a part of a building structure which is configured for lighting or ventilation of the indoor space of a building. A curtain is generally installed inside the window, by which the window can be completely or partially covered, thereby adjusting light intensity entering the indoor space from the window.

Typically, the curtain is generally entirely light-tight. A roller is installed at the top of the window, and the curtain can be completely rolled up around an outer periphery of the roller, so that the window is in a full light-transmitting mode. The curtain can also be partially released and pulled down from the roller, which results in that the upper part of the window is shaded by the curtain, and the lower part of the window is light-transmitting. When the window is completely shaded by the curtain, the curtain is in a full light-tight mode.

However, in the full light-transmitting mode, indoor privacy cannot be protected, and work or rest of indoor people is liable to be disturbed by activities outside the window, especially in low-rise buildings. In a partial light-transmitting mode, the upper part of the window is shaded, and outdoor natural light enters the room from the lower part of the window, since an activity region of the indoor people is generally at or below a middle portion of the window, the indoor privacy can only be protected to a limited extent by the curtain, and activities of the indoor people may still be visible from the lower part of the window. In addition, the outdoor natural light is blocked by the curtain, thereby resulting in a significant decrease in brightness of indoor environment. In order to meet needs of indoor privacy protection, the curtain has to be further pulled down by the indoor people to the full light-tight mode. At this time, the outdoor natural light is completely prevented by the curtain, as a result, the indoor environment cannot be illuminated by the outdoor natural light.

SUMMARY

In view of the above, the present disclosure provides a multi-mode up-down curtain that can solve or at least alleviate above technical problems.

The present disclosure provides a multi-mode up-down curtain, including:

- a winding component, including a support element and a roller rotatably mounted on the support element;
- a cord fabric, entirely or partially wound around an outer periphery of the roller; and comprising a light-transmitting section and a light-tight section; wherein the light-transmitting section and the light-tight section are connected along a stretching direction of the cord fabric; and the light-tight section is arranged in front of the light-transmitting section along the stretching direction;
- an adjusting rod, fixedly connected to an end of the light-tight section away from the light-transmitting section; and a middle part of the light-tight section slidably threaded through a penetrating slot of the adjusting rod; wherein as the cord fabric is lifted and lowered, the adjusting rod is movable long a lowering path, and the lowering path comprises an upper extreme position and a lower extreme position;
- a falling element, slidably connected to a part of the light-tight section, wherein the part of the light-tight section is located between the penetrating slot of the adjusting rod and the end of the light-tight section away from the light-transmitting section; and
- at least one pair of positioning elements, each pair of the at least one pair of positioning elements being located at a stopping position between the upper extreme position and the lower extreme position of the lowering path of the adjusting rod, and each positioning element of the at least one pair of positioning elements comprising a locked position and an unlocked position,
- wherein, when the cord fabric is lifted, the falling element abuts against the adjusting rod and is lifted together with the cord fabric; and
- wherein when the cord fabric is lowered, and when the at least one pair of positioning elements is in the locked position, the adjusting rod is capable of being positioned at the stopping position by the at least one pair of positioning elements, at this time, the falling element is capable of being lowered continuously; and when the at least one pair of positioning elements is in the unlocked position, the adjusting rod is capable of smoothly passing over the stopping position.

For the multi-mode up-down curtain above, in the case that indoor lighting needs to be met while indoor privacy is ensured, before the adjusting rod is lowered to the stopping position where the positioning elements are located, one pair of the at least one pair of positioning elements can be switched to the locked position, and lowered adjusting rod is moved to the positioning elements and is stopped by the positioning elements, thereby being positioned at the stopping position. Under a restriction of the positioning elements, the adjusting rod is positioned at the stopping position with a certain height distance relative to the bottom edge of the window, while the falling element slides downwardly as the cord fabric continues to lower. Since the end of the light-tight section is connected to the adjusting rod, the end of the light-tight section is also positioned at the stopping position and is no longer lowered. As the cord fabric continues to be lowered, the upper part of the light-tight section continues to be moved downward and passed through the adjusting rod and sags, thereby folding into a double-layer structure below the adjusting rod. The falling element always keep sliding to the bottom of the double-layer structure due to gravity, and a downward pulling force is applied to the cord fabric due to the weight of the falling element, which is not only conducive to the light-tight section to smoothly pass through the adjusting rod during a lowering process of the cord fabric, but also ensures a flatness of the cord fabric.

Since a length of the light-tight section along the stretching direction is slightly greater than a height dimension of the window, when the light-tight section is folded to a certain length in the horizontal direction, the light-transmitting section begins to be released and unfolded. When a junction between the light-transmitting section and the light-tight section is moved to a position lower than the top edge of the window, the light-transmitting section is aligned with the upper part of an opening of the window. At this time, the outdoor natural light can enter the room through the light-transmitting section. Since the remaining part of the opening of the window is still shaded by the light-tight section, the needs of indoor privacy protection can be satisfied simultaneously, avoiding requirement of full light-shading of the window which is needed to ensure the indoor privacy.

The multi-mode up-down curtain of the present disclosure can achieve the following different modes: 1. Full lighting mode; 2. Full shading mode; 3. Only lower lighting mode; 4. Only upper lighting mode; 5. Upper and lower simultaneous lighting, and middle shading mode.

In one embodiment, the at least one pair of positioning elements is slidably disposed between the locked position and the unlocked position; or the at least one pair of positioning elements is rotatably disposed between the locked position and the unlocked position.

In one embodiment, the at least one pair of positioning elements is rotatably disposed between the locked position and the unlocked position, and each positioning element defines a semi-open space with an opening orientation being adjustable by rotation.

In one embodiment, the semi-open space is entirely defined by a corresponding positioning element.

In one embodiment, the semi-open space is defined by a corresponding positioning element and an installation surface cooperatively.

In one embodiment, the semi-open space has boundary surfaces comprising two side displacement limiting boundary surfaces and a descent limiting boundary surface; the two side displacement limiting boundary surfaces are arranged opposite to each other; and the descent limiting boundary surface is arranged between the two side displacement limiting boundary surfaces.

In one embodiment, each pair of the at least one pair of positioning elements in the locked position is interfered with a lowering path of two ends of the adjusting rod.

In one embodiment, the at least one pair of positioning elements comprises two pairs of positioning elements, and the two pairs of positioning elements are distributed at different height levels along the lowering path of the adjusting rod.

In one embodiment, a height distance between one pair of positioning elements and a bottom edge of a corresponding window is 20% to 30% of a height dimension of the corresponding window.

In one embodiment, a height distance between one pair of the positioning elements and the bottom edge of a corresponding window is 40% to 60% of the height dimension of the corresponding window.

In one embodiment, a width of the penetrating slot is greater than a thickness of the light-tight section.

In one embodiment, the falling element comprises a falling body and a rolling contact element rotatably connected to the falling body; and the light-tight section is movably threaded between the rolling contact element and the falling body.

In one embodiment, the falling body is provided with a recessed groove; the rolling contact element is accommodated in the recessed groove; the recessed groove is formed between two width-limiting boundary surfaces of the falling body; and a distance between the two width-limiting boundary surfaces is greater than an outer diameter of the rolling contact element.

REFERENCE NUMERALS IN THE DRAWINGS

100, multi-mode up-down curtain; 20, winding component; 21, support element; 22, roller; 23, adjusting string; 30, cord fabric; 31, light-transmitting section 31; 32, light-tight section 32; 320, double-layer structure; 321, end edge; 301, junction; 40, adjusting rod; 41, end; 42, penetrating slot; 50, positioning element; 50*a*, first positioning element; 50*b*, second positioning element; 51, semi-open space; 511, side displacement limiting boundary surface; 512, descent limiting boundary surface; 60, falling element; 61, falling body; 611, groove; 612, width-limiting boundary surface; 62*a*/62*b*, rolling contact element; 621, rod-shaped component; 900, window; 901, top edge; 902, bottom edge; 903, installation surface; F1, stretching direction; S1, lowering path.

DESCRIPTION OF EMBODIMENTS

Technical solutions of the present disclosure are described clearly and completely below in conjunction with accompanying drawings, apparently, described embodiments are only part of the embodiments of the present disclosure, not all of the embodiments. Based on the embodiments of the present disclosure, all other embodiments obtained by those of ordinary skill in the art without creative work are within a protection scope of the present disclosure.

In the description of the present disclosure, it should be noted that the orientation or positional relationship indicated by the terms "center", "up", "down", "left", "right", "vertical", "horizontal", "inside", "outside" and the like is based on the orientation or positional relationship shown in the accompanying drawings, which is only for the convenience of describing the present disclosure and simplifying the description, rather than indicating or suggesting that a device or a component referred to must have a specific orientation and be constructed and operated in a specific orientation, and therefore the terms cannot be understood as limiting the present invention. Furthermore, the terms "first", "second" and "third" are just used for descriptive purposes, and cannot be understood as indicating or implying relative importance.

In the description of the present disclosure, it should be noted that unless otherwise expressly specified or limited, the terms "installed", "mounted", "be connected" and "connect" should be understood in a broad sense, for example, it may be a fixed connection, it may also be a detachable connection, or an integrated connection; it may be a mechanical connection, or alternatively an electrical connection; it may be a direct connection, it may also be an indirect connection through an intermediate element; alternatively, it may be an internal communication between two components. For those of ordinary skill in the art, specific meanings of the above terms in the present disclosure can be understood according to specific situations.

The technical solutions provided by the embodiments of the present disclosure are described below in conjunction with the accompanying drawings.

Figure 1:
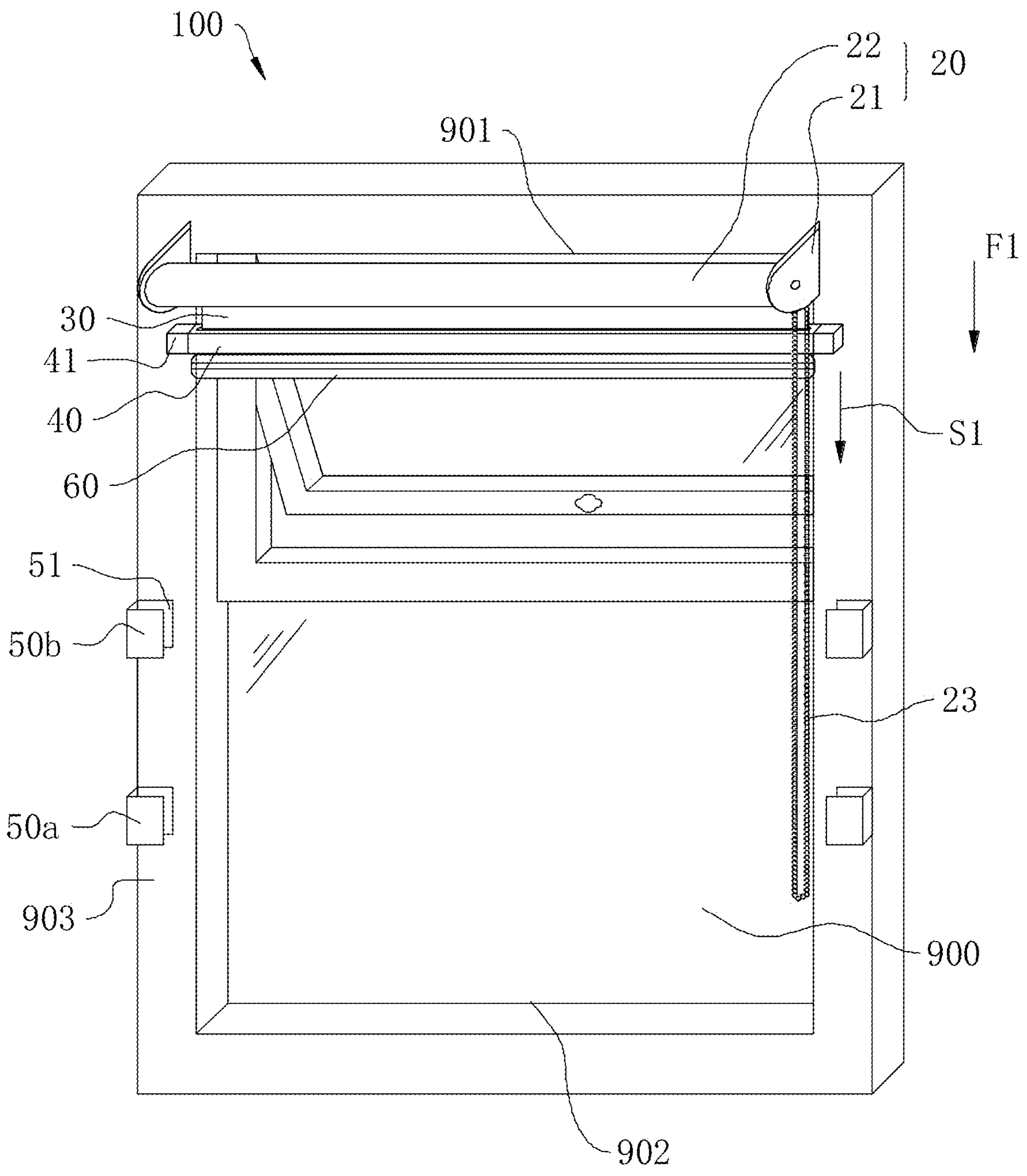
FIG. 1 is a perspective schematic view of a multi-mode up-down curtain according to one embodiment of the present disclosure, wherein a cord fabric is completely wound around an outer periphery of a roller, and the window is in full light-transmitting state.

Referring to FIG. 1, a multi-mode up-down curtain 100 is provided by the present disclosure, the multi-mode up-down curtain 100 is capable of entirely or partially shading a window 900 in an adjustable manner, thereby completely or partially shading natural light entering a room from the window 900, to adjust a brightness of the room; and thus a shading degree of the multi-mode up-down curtain 100 on the window 900 can be adjusted as needed, to protect indoor privacy. Specifically, the window 900 can be a floor-to-ceiling window 900, or a window with a bottom edge 902 located above the ground on a same floor with a height difference there between.

Specifically, the window 900 described in the present disclosure includes not only one or more holes on an opaque wall in a traditional sense that at least allow outdoor light to enter the room (the holes may also allow both the outdoor light and air to enter the room), but also a transparent or translucent wall in a modern sense. The transparent or translucent wall is a device that allows the outdoor light to enter the room, and is mainly composed of a single piece or a plurality of pieces of transparent or translucent glass and is equipped with a supporting frame. That is, no matter whether there are the holes in the wall, as long as there exists a light-transmitting part, the light-transmitting part falls within a scope of the window of the present disclosure.

In some embodiments, the window 900 can be understood as a building structure with an opening. The opening can be understood as the holes that at least allow the outdoor light to enter the room (the holes may also allow the outdoor light and air to enter the room at the same time). A boundary of the opening of the window 900 is formed by the wall. In some other embodiments, the boundary of the opening of the window 900 is formed by a metal or plastic frame. A support element 21 is installed on a wall or a metal frame. In some further embodiments, the boundary of the opening of the window 900 can be formed by glass or other rigid materials. Specifically, a height dimension of the window 900 can be understood as a measurement between a top edge 901 and the bottom edge 902 of the window 900.

In some embodiments, the opening of the window 900 is at least light-transmitting. Furthermore, the opening of the window 900 can also be air-permeable. In some embodiments, the opening of the window 900 is completely open and is not shaded by a light-transmitting and wind-blocking structure, and therefore the window 900 has both light transmittance and air permeability.

In some embodiments, the opening of the window 900 is shaded by the light-transmitting and wind-blocking structure, and the window 900 is light-transmitting but not air-permeable. A material of the light-transmitting and wind-blocking structure may include glass, acrylic or other translucent materials. In some other embodiments, the opening of the window 900 can also be understood as a local light-transmitting area in a single piece of glass, and areas other than the local light-transmitting area can be light-tight by applying film, painting, glass dyeing, or the like.

Figure 3A:
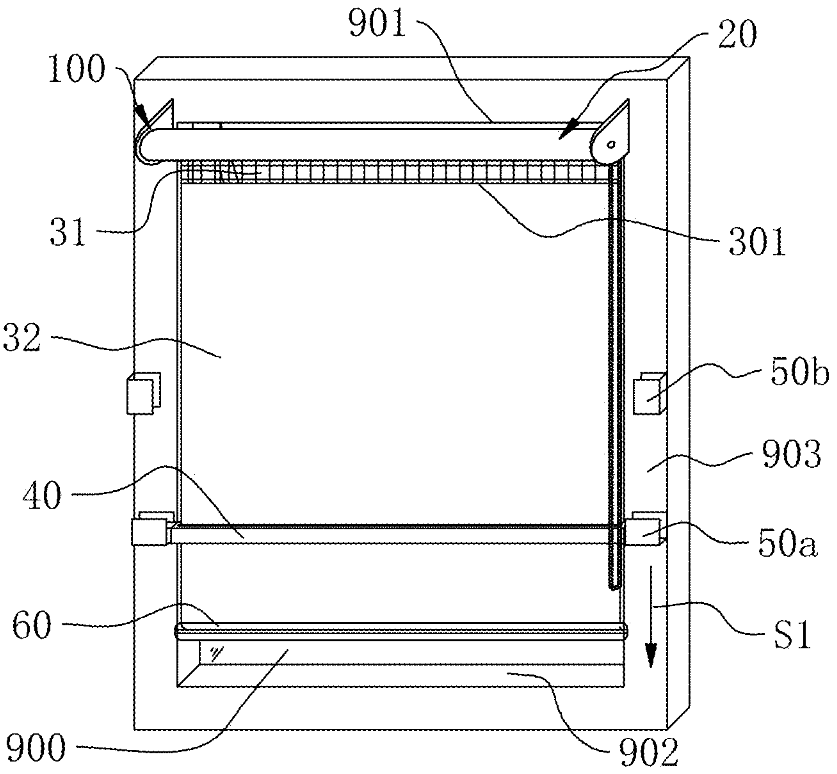
FIG. 3A is a perspective schematic view of the multi-mode up-down curtain shown in FIG. 1 in another state, wherein a first positioning element pair and a second positioning element pair are spaced apart in a vertical direction, a height level of the second positioning element pair is arranged higher than a height level of the first positioning element pair, the second positioning element pair is in an unlocked position and the first positioning element pair is in a locked position, an adjusting rod is supported at the first positioning element pair, and a falling element is located higher than a bottom edge of the window.
Figure 3B:
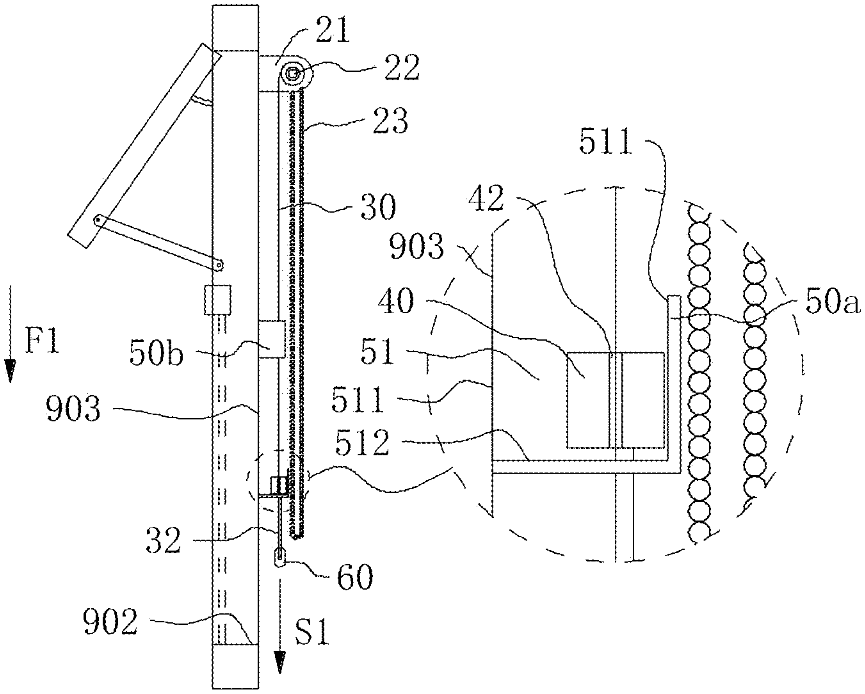
FIG. 3B is a side view of the multi-mode up-down curtain shown in FIG. 3A.
Figure 7A:
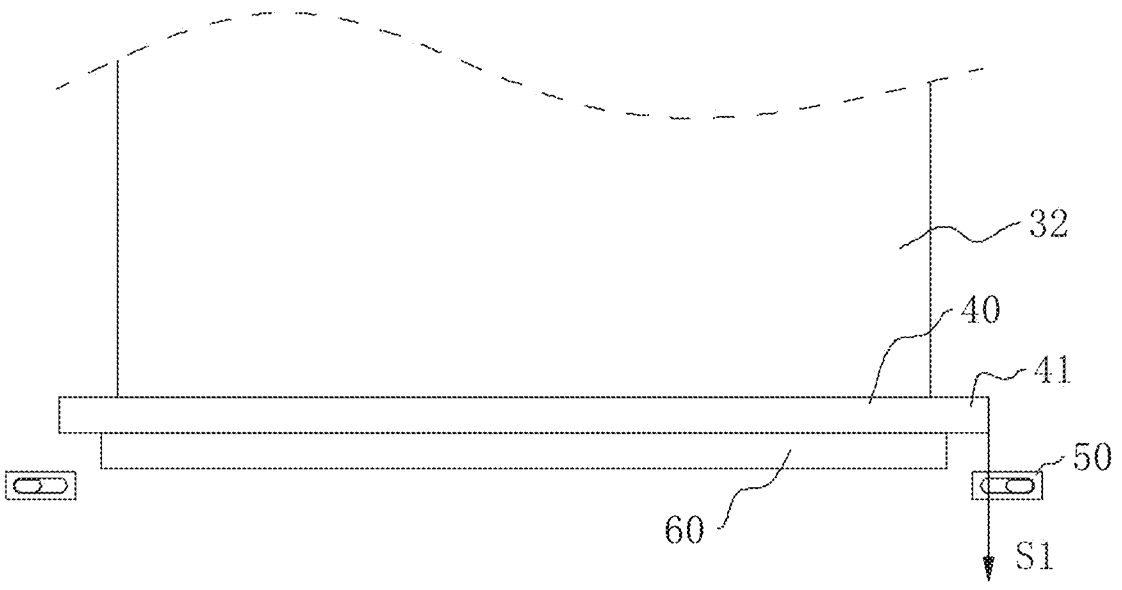
FIG. 7A is a perspective schematic view of a multi-mode up-down curtain according to yet another embodiment of the present disclosure, and the positioning elements are in the locked position.

In some embodiments, as shown in FIG. 3A, FIG. 3B and FIG. 7A, the multi-mode up-down curtain 100 includes a winding component 20, a cord fabric 30, an adjusting rod 40, at least one pair of positioning elements 50, and a falling element 60. The winding component 20 includes a support element 21 and a roller 22 rotatably mounted on the support element 21. The cord fabric 30 is made of flexible fabric and can be completely or partially wound around an outer periphery of the roller 22.

The cord fabric 30 includes a light-transmitting section 31 and a light-tight section 32. The light-transmitting section 31 and the light-tight section 32 are connected one another along a stretching direction F1 of the cord fabric 30. The light-tight section 32 is arranged in front of the light-transmitting section 31 along the stretching direction F1. When the cord fabric 30 is completely deployed, the light-transmitting section 31 is located above the light-tight section 32. Preferably, a length of the light-tight section 32 along the stretching direction F1 is slightly greater than an overall height of the opening of the window 900, therefore the opening of the window 900 can be completely covered by the light-tight section 32. A length of the light-transmitting section 31 can be determined according to needs, for example, the length of the light-transmitting section 31 can be ⅓, ½, or ¾ of the length of the light-tight section 32, which can be determined according to actual conditions.

The light-tight section 32 is made of light-impervious fabric. The light-transmitting section 31 can be formed by light-transmitting fabric, or can be formed by providing one or more hollow portions on the cord fabric 30.

The adjusting rod 40 is fixedly connected to an end of the light-tight section 32 (that is, one end of the light-tight section 32 away from the light-transmitting section 31), and the adjusting rod 40 is lifted and lowered together with the light-tight section 32 when the cord fabric 30 is lifted and lowered. Before the adjusting rod 40 is positioned on the positioning elements (the positioning elements 50 as shown in FIG. 7A, the first positioning elements 50*a* or the second positioning element 50*b* as shown in FIG. 1), the adjusting rod 40 is arranged at an interval from the light-transmitting section 31 along the stretching direction F1 of the cord fabric 30. A middle part of the light-tight section 32 slidably extends through a penetrating slot 42 of the adjusting rod 40. As the cord fabric 30 lifts and lowers, the adjusting rod 40 can move up and down along a lowering path S1, and the lowering path S1 has an upper extreme position and a lower extreme position. The light-tight section 32 forms a double-layer structure 320 below the adjusting rod 40.

At least one pair of positioning elements is mounted beside the window 900, specifically, the two positioning elements of each pair are symmetrically arranged on two sides of the window respectively. The pair of positioning elements is located between the upper extreme position and the lower extreme position of the lowering path S1 of the adjusting rod 40, to interact with the adjusting rod 40. The positioning elements are movable between a locked position and an unlocked position. When the positioning elements are in the locked position, the positioning elements are interfered with the lowering path S1 of the adjusting rod 40, at this time, the adjusting rod 40 will be stopped by the positioning elements, to prevent the adjusting rod 40 from further lowering. When the positioning elements are in the unlocked position, the positioning elements are free of interfering with the lowering path S1 of the adjusting rod 40, at this time, the adjusting rod 40 can smoothly lower downwardly over the positioning elements to a position below the positioning elements. In the present disclosure, a position aligned with the level of the positioning elements is defined as a stopping position.

In some embodiment, as shown in FIG. 3A and FIG. 3B, the multi-mode up-down curtain 100 is provided with a pair of first positioning elements 50*a* located at a same level and a pair of second positioning elements 50*b* located at a same level. The first positioning element pair 50*a* and the second positioning element pair 50*b* are located at different height levels, and the first positioning element pair 50*a* are located below the second positioning elements 50*b*.

The falling element 60 is slidably connected to a part of the light-tight section 32 between the penetrating slot 42 of the adjusting rod 40 and the end of the light-tight section 32.

When the cord fabric 30 is lifted, the falling element 60 slides to an end edge 321 of the light-tight section 32 due to its weight. Since the end edge 321 of the light-tight section 32 is connected to the adjusting rod 40, the falling element 60 will not fall off from the cord fabric 30, and at this time, the adjusting rod 40 also slides relative to the light-tight section 32 until it abuts against the falling element 60 and then the adjusting rod 40 will move upwardly together with the cord fabric 30.

When the cord fabric 30 is lowered downwardly and the positioning elements are in the unlocked position, the adjusting rod 40 can smoothly pass the stopping position. When the positioning elements are in the locked position, the adjusting rod 40 will be positioned at the stopping position, that is, the adjusting rod 40 will be positioned at the positioning elements, and at this time, the falling element 60 can continue to lower. As the cord fabric 30 continues to lower, the light-tight section 32 also continues to lower. However, since the end edge 321 of the light-tight section 32 is fixedly connected to the adjusting rod 40, and the middle part of the light-tight section 32 slides through the adjusting rod 40, a part of the light-tight section 32 located on a lower side of the adjusting rod 40 is folded into the double-layer structure 320. It can be understood that as a lowering displacement amount of the cord fabric 30 varies, a length of the double-layer structure 320 along the vertical direction changes. However, regardless of how the lowering displacement amount of the cord fabric 30 changes, since the falling element 60 is slidably connected at the double-layer structure 320 and under an action of its own weight, the falling element 60 is always located at the bottom end of the double-layer structure 320.

In one embodiment, the double-layer structure 320 serves to hang or bear all or part of the falling element 60.

Specifically, as shown in FIG. 1, the roller 22 is installed adjacent to the top edge 901 of the window 900 through the support elements 21. The roller 22 can be rotated relative to the support elements 21 to a predetermined angle under traction. When the roller 22 is rotated in a direction of winding up the cord fabric 30, a length of the cord fabric 30 wound around the outer periphery of the roller 22 is increased. Since the light-tight section 32 is arranged in front of the light-transmitting section 31 along the stretching direction F1, the light-tight section 32 begins to be wound around the outer periphery of the roller 22 until the light-transmitting section 31 has been completely wound around the outer periphery of the roller 22.

Figure 2:
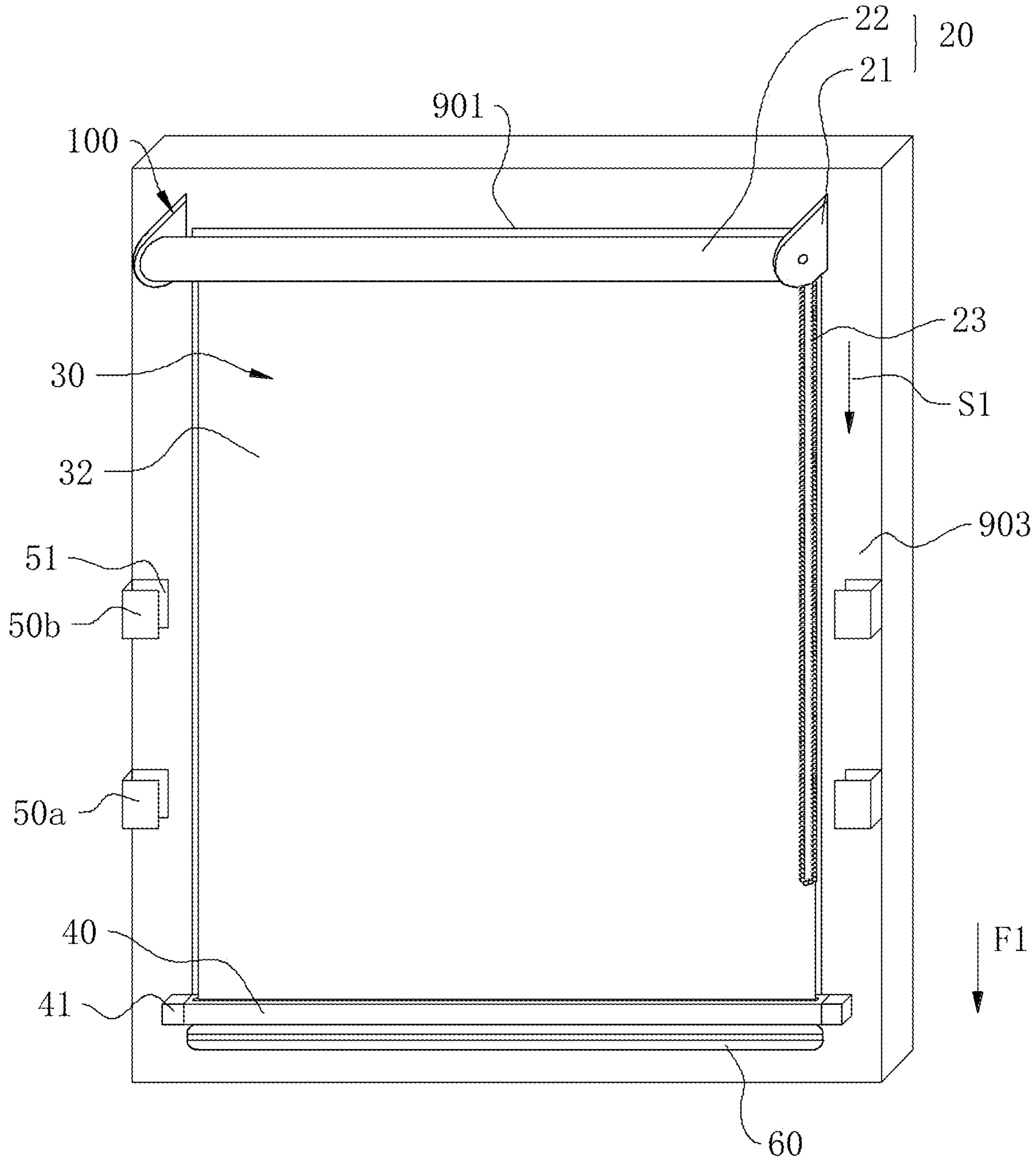
FIG. 2 is a perspective schematic view of the multi-mode up-down curtain shown in FIG. 1 in another state.

As shown in FIG. 2, in the deployed state, a length of the light-tight section 32 along the stretching direction F1 is slightly longer than the height dimension of the window 900, therefore, when the light-tight section 32 is completely deployed, the window 900 can be completely covered by the light-tight section 32. When the roller 22 is rotated in a direction of releasing the cord fabric 30, the cord fabric 30 is gradually released from the outer periphery of the roller 22 and unfolded. The cord fabric 30 sags downwardly under the action of gravity. Since the adjusting rod 40 and the falling element 60 are respectively connected to the cord fabric 30, when the roller 22 is rotated in the direction of releasing the cord fabric 30, the adjusting rod 40 and the falling element 60 are lowered accordingly. Since the adjusting rod 40 is fixedly connected to the end of the light-tight section 32, and the falling element 60 is slidably connected to the part of the light-tight section 32 located between the adjusting rod 40 and the end of the light-tight section 32, before the adjusting rod 40 is lowered to contact the positioning elements (the positioning elements 50 as shown in FIG. 7A, the first positioning element 50*a*, or the second positioning element 50*b* as shown in FIG. 1), the falling element 60 abuts against the adjusting rod 40, and is lowered together with the light-tight section 32. The positioning elements are installed beside the window 900, and the level of the positioning elements is higher than that of the bottom edge 902 of the window 900.

In the case that the adjusting rod 40 is positioned at the positioning elements, i.e., at the stopping position, and the falling element 60 is at a lower position relative to the adjusting rod 40, and when the roller 22 is rotated in the direction of winding up the cord fabric 30, since the part of the light-tight section 32 connected to the adjusting rod 40 is restricted by the adjusting rod 40, a vertical dimension of the double-layer structure 320 is shortened by means of the rotation of the roller 22, and the falling element 60 is lifted due to restriction by the end of the light-tight section 32 fixedly connected to the adjusting rod 40, until the falling element 60 abuts against the adjusting rod 40 upwardly. Thereafter, when the roller 22 continues to be rotated in the direction of winding up the cord fabric 30, drawn by the light-tight section 32, the adjusting rod 40 is pushed by the falling element 60 to leave the positioning elements and continue to lift.

Figure 4A:
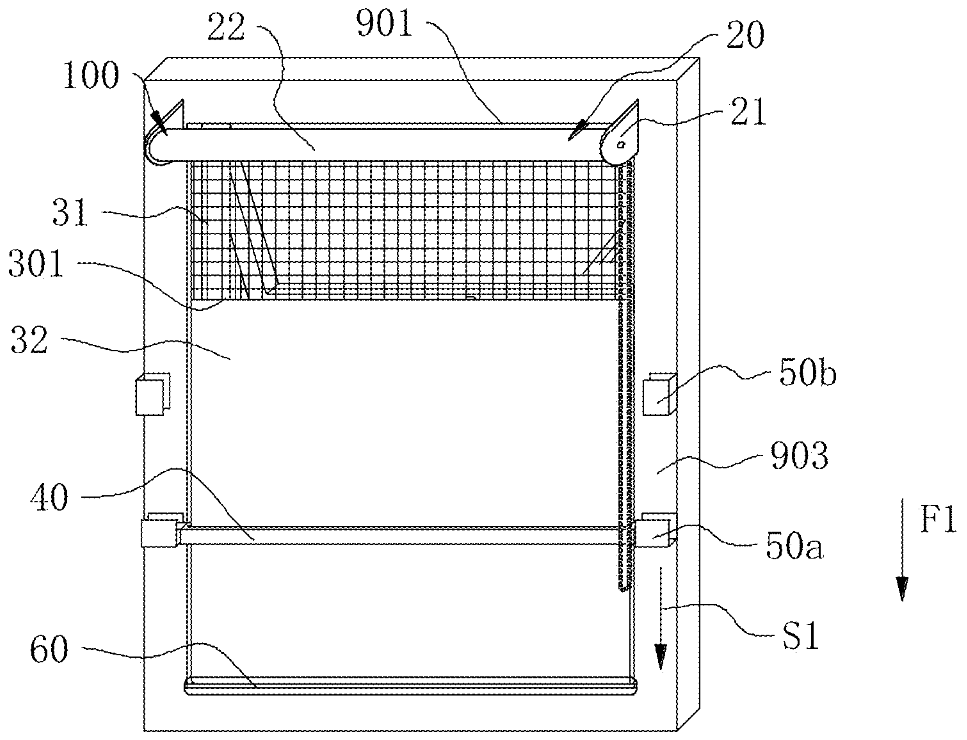
FIG. 4A is a perspective schematic view of the multi-mode up-down curtain shown in FIG. 3A in another state, and a level of the falling element is aligned with the bottom edge of the window.
Figure 4B:
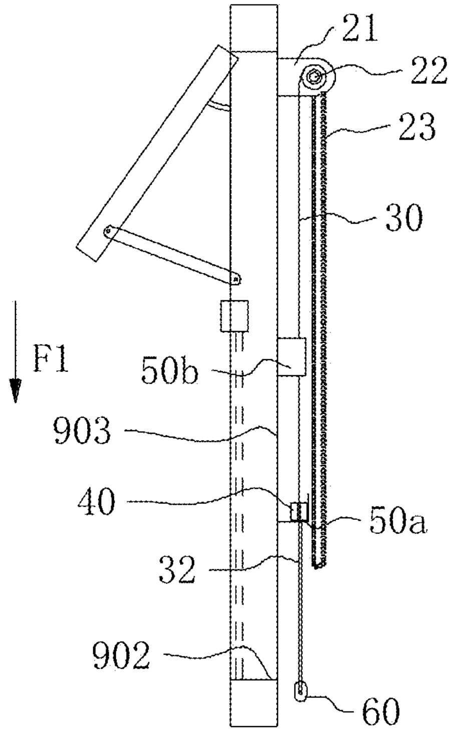
FIG. 4B is a side view of the multi-mode up-down curtain shown in FIG. 4A.
Figure 5A:
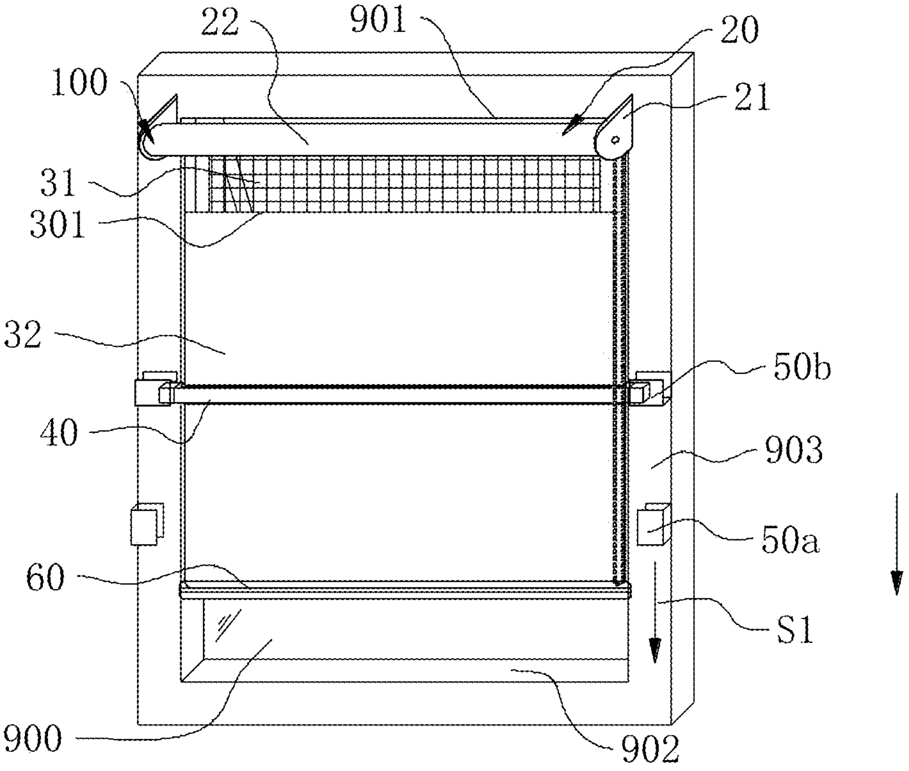
FIG. 5A is a perspective schematic view of the multi-mode up-down curtain shown in FIG. 1 in another state, wherein the second positioning element pair is in the locked position and the first positioning element pair is in the unlocked position, the adjusting rod is supported at the second positioning element pair, and the falling element is located higher than the bottom edge of the window.
Figure 5B:
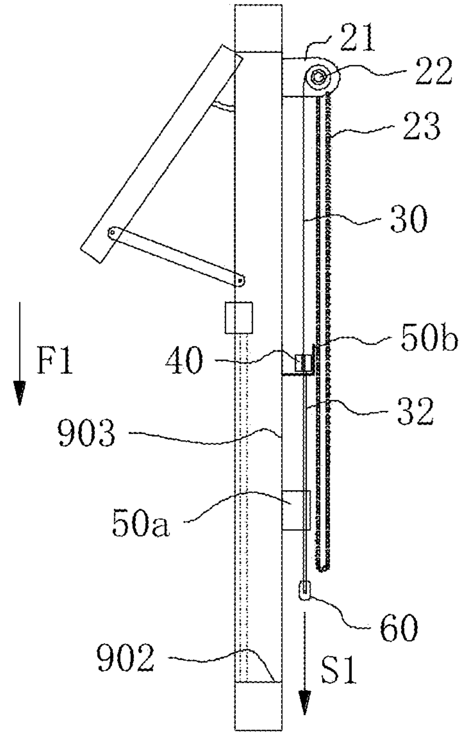
FIG. 5B is a side view of the multi-mode up-down curtain shown in FIG. 5A.
Figure 6A:
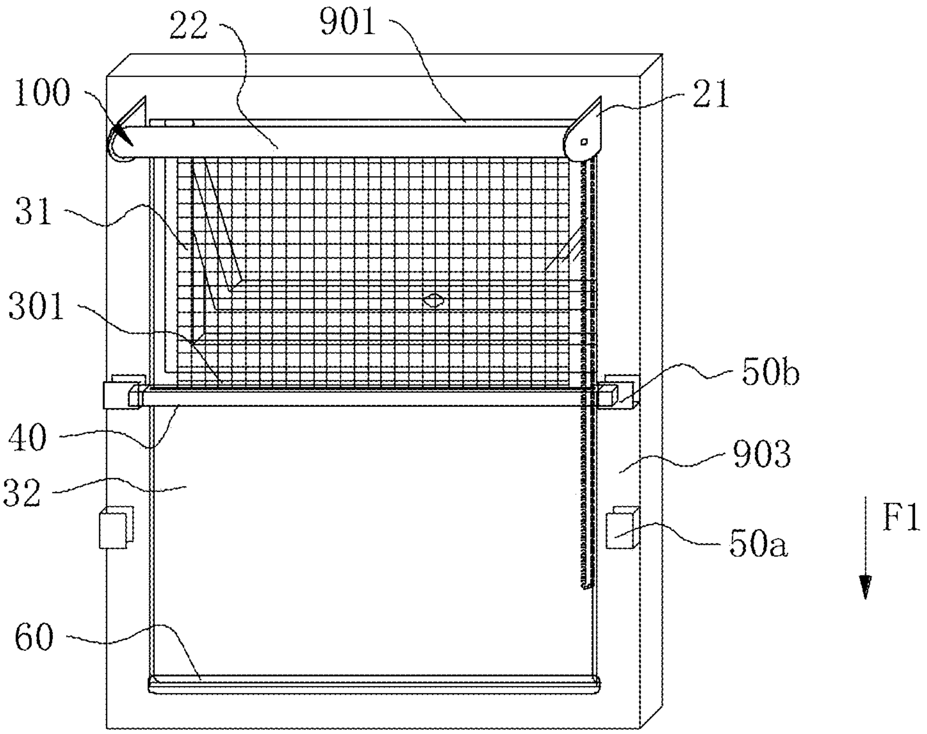
FIG. 6A is a perspective schematic view of a multi-mode up-down curtain according to another embodiment of the present disclosure, and the level of the falling element is aligned with the bottom edge of the window.

In the case that indoor lighting needs to be met while the indoor privacy needs to be ensured, before the adjusting rod 40 is lowered to the stopping position where the positioning elements are located, one pair of positioning elements (the first positioning element pair 50*a* as shown in FIG. 3A and FIG. 4A, or the second positioning element pair 50*b* as shown in FIG. 5A and FIG. 5B and FIG. 6A) can be switched to the locked position, and the lowered adjusting rod 40 is moved to the positioning elements and is stopped by the positioning elements, thereby being positioned at the stopping position. Under a restriction of the positioning elements, the adjusting rod 40 is positioned at a stopping position with a certain height relative to the bottom edge 902 of the window 900, while the falling element 60 slides downwardly as the cord fabric 30 continues to lower. Since the end of the light-tight section 32 is connected to the adjusting rod 40, the end of the light-tight section 32 is also positioned at the stopping position and is no longer lowered, As the cord fabric 30 continues to lower, the upper part of the light-tight section 32 continues to move downwardly and passed through the adjusting rod 40 and sags, thereby folding into the double-layer structure 320 below the adjusting rod 40. The falling element 60 always keep sliding to the bottom of the double-layer structure 320 due to its own weight, and a downward pulling force is applied to the cord fabric 30 due to the weight of the falling element 60, which is not only conducive to the light-tight section 32 to smoothly pass through the adjusting rod 40 during a lowering process of the cord fabric 30, but also ensures a flatness of the cord fabric 30.

Since the length of the light-tight section 32 along the stretching direction F1 is slightly greater than the height dimension of the window 900, when the light-tight section 32 is folded to a certain length in the horizontal direction, the light-transmitting section 31 begins to be released and unfolded. When a junction 301 between the light-transmitting section 31 and the light-tight section 32 is moved to a position lower than the top edge 901 of the window 900, the light-transmitting section 31 is aligned with the upper part of the opening of the window 900. At this time, the outdoor natural light can enter the room through the light-transmitting section 31. Since the remaining part of the opening of the window 900 is still shaded by the light-tight section 32, the needs of indoor privacy protection can be satisfied simultaneously, avoiding requirement of full light-shading of the window 900 when it is needed to ensure the indoor privacy.

A degree of deployment of the light-transmitting section 31 can be determined by users according to the needs for lighting and protecting privacy. As shown in FIG. 3A and FIG. 5A, the light-transmitting section 31 can be partially deployed, at this time, the lower part of the opening of the window 900 is not completely covered by the lower part of the light-tight section 32, and light can be received both through the light-transmitting section 31 above and the exposed opening of the window 900 below. It can also be shown in FIG. 4A and FIG. 6A, the cord fabric 30 is further deployed, to make the lower part of the opening of the window 900 completely be covered by the light-tight section 32, and light is received only through the light-transmitting section 31 above, and thus the indoor privacy can be better protected without affecting lighting.

It can be seen from FIGS. 3A, 4A, 5A, and 6A that when both lighting and better protection of the indoor privacy are required, the first positioning element 50*a* can be switched to the locked state (as shown in FIGS. 3A and 4A). However, when both indoor privacy protection and better lighting are needed, the second positioning element 50*b* can be switched to the locked state (as shown in FIGS. 5A and 6A). Users can choose flexibly according to actual needs, in order to get a balance between lighting and privacy protection, to thereby satisfy the users need.

As shown in FIG. 2, when the indoor people needs to sleep, the window 900 can be completely shaded by the multi-mode up-down curtain 100 in the full light-tight mode. Before the adjusting rod 40 lowers to the position of the positioning elements (the first positioning element 50*a* or the second positioning element 50*b* as shown in FIG. 2), the positioning elements are switched to the unlocked position. The adjusting rod 40 will not be interfered by the positioning elements during the lowering process, so the adjusting rod 40 can be smoothly lowered to the bottom edge 902 of the window 900. Since the length dimension of the light-tight section 32 along the stretching direction F1 is slightly longer than the height dimension of the opening of the window 900, the window 900 can be completely shaded by the light-tight section 32. When the user needs full lighting, he or she only needs to roll the light-transmitting section 31 and the light-tight section 32 of the cord fabric 30 completely around the outer periphery of the roller 22.

Figure 8:
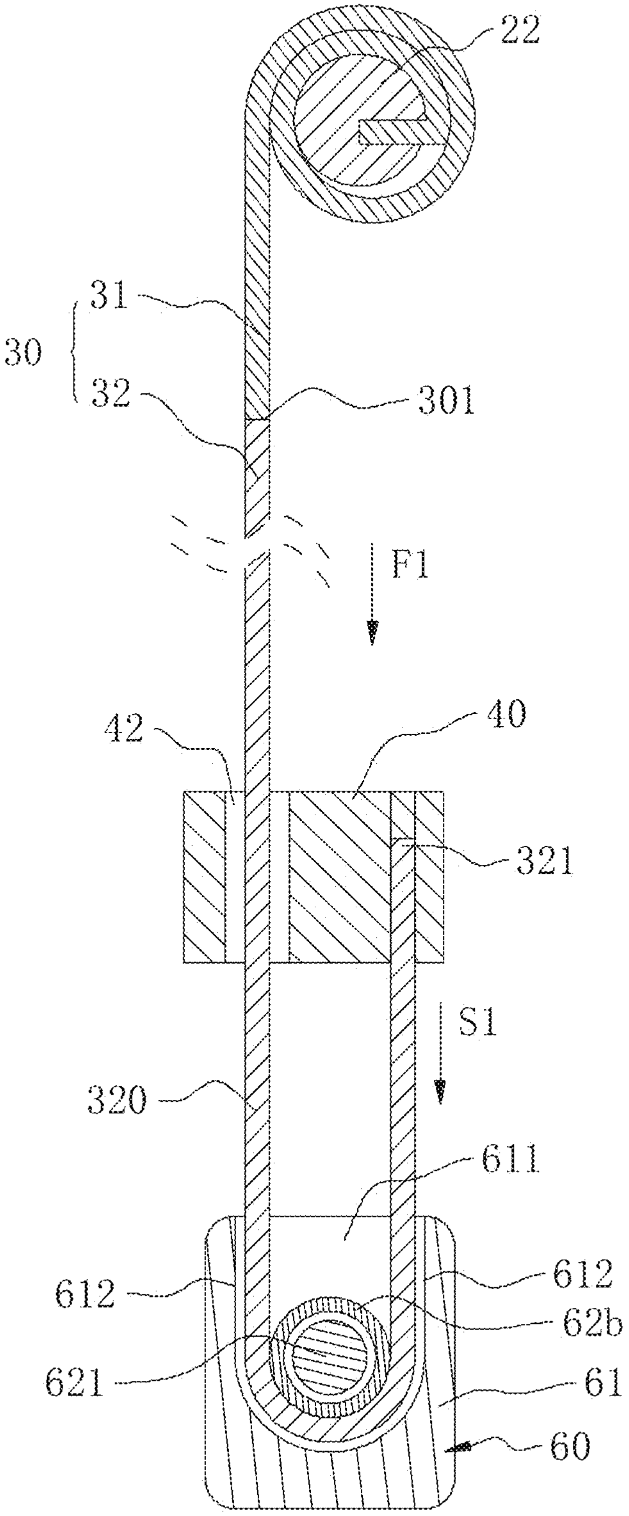
FIG. 8 is a structure view of a multi-mode up-down curtain according to one embodiment of the present disclosure.

Specifically, as shown in FIG. 4A and FIG. 8, the junction 301 is a transition position between the light-transmitting section 31 and the light-tight section 32.

In some embodiments, as shown in FIG. 1 and FIG. 2, the support elements 21 are provided in a pair. One end of the roller 22 is installed on one of the support elements 21, and the other end of the roller 22 is installed on the other support element 21. In some embodiments, a level of the roller 22 is slightly higher than that of the top edge 901 of the window 900. Thus, when the window 900 is completely shaded by the light-tight section 32, undesired light leakage through a gap between the top edge 901 of the window 900 and the light-tight section 32 can be avoided.

In some embodiments, in order to avoid the roller 22 rotating along the direction of releasing due to the gravity of the falling element 60, damped rotation of the roller 22 is provided. In some embodiments, as shown in FIG. 1, the roller 22 is rotated under the traction of an adjusting string 23, and when the adjusting string 23 is released from being pulled, the roller 22 is positioned at a stable angle.

In some embodiments, the cord fabric 30 can be made of flame-retardant fabric.

In some embodiments, the light-transmitting section 31 can be provided with a light-transmitting area and a light-impervious area, the outdoor natural light can pass through the light-transmitting area, and an area of the light-transmitting area of the light-transmitting segment 31 may be greater than an area of the light-impervious area. In some embodiments, the light-transmitting section 31 can also be formed by one or more hollow portions on light-impervious fabrics. In some embodiments, as shown in FIG. 5A and FIG. 6A, the light-transmitting section 31 is made of meshed fabric.

In some embodiment, light transmittance of the light-transmitting section 31 is greater than light transmittance of the light-tight section 32. In some embodiment, weaving density of the light-transmitting section 31 is smaller than weaving density of the light-tight section 32. In some embodiments, the light-transmitting section 31 is made of a transparent material or a semi-transparent material, and the light-tight section 32 is made of the semi-transparent material or a non-transparent material.

In some embodiments, as shown in FIG. 3A to FIG. 4B, the first positioning elements 50*a* and the second positioning elements 50*b* are rotatably arranged, therefore, they can be switched between the locked position and the unlocked position. Specifically, the first positioning elements 50*a* and the second positioning elements 50*b* can be installed on an installation surface 903 adjacent to the window 900 through a rotating shaft. When the first positioning element 50*a* is rotated about the rotating shaft component, it will be switched between the locked position and the unlocked position.

Figure 6B:
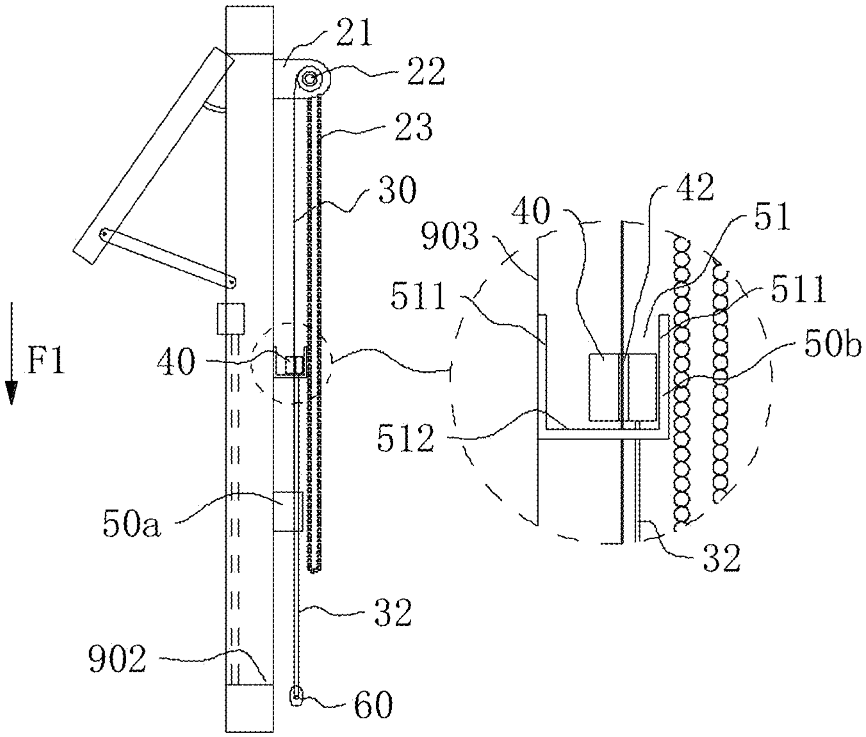
FIG. 6B is a side view of the multi-mode up-down curtain shown in FIG. 6A.

As shown in FIG. 5A to FIG. 6B, in some embodiments, a semi-open space 51 is defined by the positioning elements (the first positioning elements 50*a* or the second positioning elements 50*b* as shown in FIGS. 6A and 6B) that has an opening, and the opening orientation can be adjusted by rotating the position elements. Specifically, when the positioning elements are in the unlocked position, the adjusting rod 40 can freely pass through the semi-open space 51. In the case that the positioning elements are in the locked position, when the adjusting rod 40 is lowered to the level of the positioning elements, the adjusting rod 40 is blocked by at least one boundary surface of the semi-open space 51, and thus the adjusting rod 40 is positioned at the level of the positioning elements, i.e., the stopping position. In this embodiment, as shown in FIG. 6B, a shape of a cross section of the second positioning element 50*b* is substantially U-shaped.

In some embodiments, as shown in FIG. 3B, the semi-open space 51 with the opening orientation that can be adjusted by rotation is defined by the positioning elements (the first positioning elements 50*a* or the second positioning elements 50*b* as shown in FIGS. 3A and 3B) and the installation surface 903 cooperatively. Specifically, when the positioning elements are in the unlocked position, the adjusting rod 40 can freely pass through a gap between the positioning elements and the installation surface 903. In this embodiment, as shown in FIG. 3B, a shape of a cross section of the first positioning element 50*a* is substantially L-shaped.

In some embodiments, as shown in FIG. 3B and FIG. 6B, the at least one boundary surface of the semi-open space 51 includes two side displacement limiting boundary surface 511 and a descent limiting boundary surface 512. The two side displacement limiting boundary surfaces 511 are arranged opposite to each other. The descent limiting boundary surface 512 is arranged between the two side displacement limiting boundary surfaces 511. In some embodiments, as shown in FIG. 3B, in the case that the first positioning elements 50*a* are in the locked position and the adjusting rod 40 is accommodated in the semi-open space 51, the adjusting rod 40 abuts against the descent limiting boundary surface 512, thereby limiting the lowering of the adjusting rod 40. In a horizontal direction perpendicular to the length direction of the adjusting rod 40, movement of the adjusting rod 40 in the horizontal direction is limited by the side displacement limiting boundary surfaces 511, so that the adjusting rod 40 can be stabilized in the semi-open space 51. In some embodiments, as shown in FIG. 2 and FIG. 3B, when the second positioning element 50*b* is in the unlocked position, the side displacement limiting boundary surfaces 511 and the descent limiting boundary surface 512 are all perpendicular to the horizontal plane, and the descent limiting boundary surface 512 is away from a center of the adjusting rod 40 than the side displacement limiting boundary surface 511, therefore, the adjusting rod 40 can pass through the semi-open space between the two opposite side displacement limiting boundary surfaces 511.

In some embodiments, as shown in FIG. 6B, in the case that the positioning elements (the first positioning element 50*a* or the second positioning element 50*b* as shown in FIG. 6A and FIG. 6B) are provided with the semi-open space 51, the side displacement limiting boundary surface 511 and the descent limiting boundary surface 512 are formed merely by the second positioning element 50*b*. In some other embodiments, as shown in FIG. 3B, in the case that the semi-open space 51 is defined by the positioning elements (the first positioning element 50*a* or the second positioning element 50*b* as shown in FIG. 3A and FIG. 3B) and the installation surface 903 together, one side displacement limiting boundary surface 511 is formed by the installation surface 903, and the other side displacement limiting boundary surface 511 and the descent limiting boundary surface 512 are formed by the first positioning element 50*a*. As shown in FIG. 2, in the case that the positioning elements (the first positioning element 50*a* or the second positioning element 50*b* as shown in FIG. 2) are in the unlocked position, an end 41 of the adjusting rod 40 passes through the semi-open space 51. Since a length of the end 41 of the adjusting rod 40 is small, the semi-open space 51 only needs to be provided for the end 41 of the adjusting rod 40 to pass through, thereby reducing a volume requirement of the semi-open space 51.

Figure 7B:
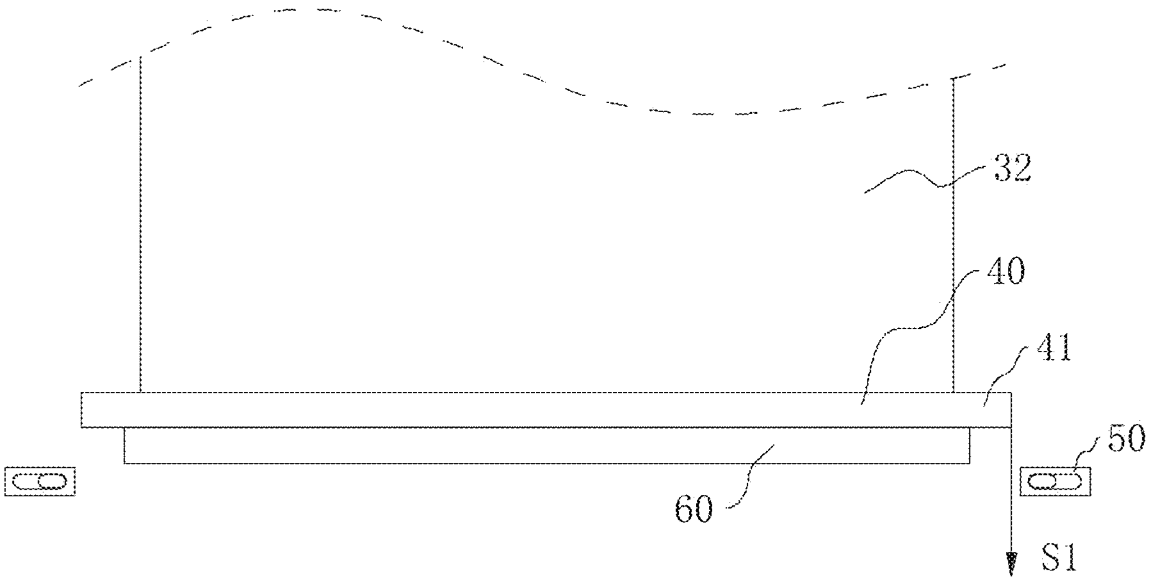
FIG. 7B is a perspective schematic view of the multi-mode up-down curtain shown in FIG. 7A in another state, and the positioning elements are in the unlocked position.

In some embodiments, as shown in FIG. 7A and FIG. 7B, the positioning elements 50 are slidably disposed between the locked position and the unlocked position. In some embodiments, the positioning elements 50 can be installed on the installation surface 903 adjacent to the window 900 through a guide component, such as a guide rail. The positioning element 50 is in sliding fit with the guide component. In some embodiments, the positioning element 50 is slidably disposed between the locked position and the unlocked position along the horizontal direction. Specifically, since an orientation of the positioning element 50 is limited by the guide component, the positioning element 50 is kept at a stable angle when sliding between the locked position and the unlocked position, therefore, the positioning elements 50 can support the adjusting rod 40 in the locked position. In some embodiments, a sliding direction of the positioning element 50 may be parallel to a length direction of the adjusting rod 40. In some other embodiments, the sliding direction of the positioning element 50 may be perpendicular to the installation surface 903, by providing an insertion space for the positioning element 50 on the installation surface 90.

In some embodiments, as shown in FIG. 7A and FIG. 7B, the positioning elements 50 are provided in pairs. Each pair of positioning elements 50 interferes with the lowering path S1 of two ends 41 of the adjusting rod 40 when in the locked position. Specifically, in the case of that the positioning element 50 is in the locked position, one end 41 of the adjusting rod 40 is supported by one positioning element 50 of a pair, and the other end 41 is supported by another positioning element 50 of the pair, thereby providing more stable support for the adjusting rod 40 and preventing the adjusting rod 40 from tilting and sliding downwardly.

In some embodiments, as shown in FIG. 7A and FIG. 7B, the two positioning elements 50 of a same pair are arranged at a same height level. In some embodiments, a horizontal distance between the two positioning elements 50 at the unlocked position is not less than the horizontal length of the adjusting rod 40, therefore, interference between the positioning elements 50 at the unlocked position and the lowering path S1 of the adjusting rod 40 can be avoided, and the adjusting rod 40 can be lowered and pass through the space between the two positioning elements 50. In some embodiments, the length direction of the adjusting rod 40 and the length direction of the falling element 60 are parallel to the horizontal direction respectively. The length of the falling element 60 is smaller than the length of the adjusting rod 40, to avoid the falling of the falling element 60 being affected by the positioning elements 50. In some embodiments, a distance between the two positioning elements 50 of a pair in the locked position is greater than the length of the falling element 60.

In some embodiments, as shown in FIG. 1 and FIG. 2, at least two pairs of positioning elements are provided and distributed at different height levels along the lowering path S1 of the adjusting rod 40. Specifically, the at least two pairs of positioning elements are distributed at different stopping positions along the lowering path S1 of the adjusting rod 40, and as shown in FIG. 2, when all the positioning elements are in the unlocked position, the window 900 can be completely shaded by the light-tight section 32. As shown in FIG. 3A and FIG. 5A, the adjusting rod 40 can be stopped from lowering at a corresponding height level, by adjusting one pair of positioning elements to the locked position and the other positioning elements to the unlocked position, therefore, the light-tight section 32 can be formed into different folding states, or the junction 301 between the light-tight section 32 and the light transmitting section 31 can be positioned at different heights.

In some embodiments, a height distance between one pair of positioning elements (the first positioning element 50*a* as shown in FIGS. 3A and 4A) and the bottom edge 902 of the window 900 is about 20% to 30% of the height dimension of the window 900. Specifically, as shown in FIG. 3A to FIG. 4B, a height distance between the pair of the first positioning elements 50*a* and the bottom edge 902 of the window 900 is about 25% of the height dimension of the window 900. The height dimension of the window 900 is defined as L, when the first positioning elements 50*a* are in the locked position, the adjusting rod 40 is positioned at a height level of the first positioning elements 50*a*, in the case that a lowering displacement of the falling element 60 relative to the adjusting rod 40 is greater than-L and less than-L, since the height level of the falling element 60 is higher than the bottom edge 902 of the window 900, a small lighting or ventilation space can be formed between the falling element 60 and the bottom edge 902 of the window 900 in the height direction, which will not significantly affect the indoor privacy. In the case that the lowering displacement of the falling element 60 relative to the adjusting rod 40 is greater than-L and less than-L, since the length of the light-tight section 32 along the stretching direction F1 is about L, a height level of the junction 301 is lower than the top edge 901 of the window 900, and a distance between the junction 301 and the top edge 901 of the window 900 in the height direction is greater than zero and less than-L. The light-transmitting section 31 is located between the top edge 901 of the window 900 and the junction 301 in the height direction, therefore, the outdoor natural light can enter the room through the light-transmitting section 31.

As shown in FIG. 3A, in the case that the lowering displacement of the falling element 60 relative to the adjusting rod 40 is equal to $\frac{1}{6}$ L, the falling element 60 is located above the bottom edge 902 of the window 900 by a distance of $\frac{1}{12}$ L. The junction 301 is located below the top edge 901 of the window 900 by a distance of $\frac{1}{12}$ L, therefore, two light-transmitting areas are formed in the upper and lower parts of the window 900 respectively, and height dimensions of the two light-transmitting areas are equal and are both $\frac{1}{12}$ L. One of the two light-transmitting areas is adjacent to the top edge 901 of the window 900, and the other light-transmitting area is adjacent to the bottom edge 902 of the window 900, therefore, the middle of the window 900 can still remain shaded by a relatively large area.

As shown in FIG. 4A, in the case that the lowering displacement of the falling element 60 relative to the adjusting rod 40 is equal to $\frac{1}{4}$ L, the height level of the falling element 60 is aligned with the height level of the bottom edge 902 of the window 900, that is, the lower part is completely shaded, while a distance between the upper junction 301 and the top edge 901 of the window 900 in the height direction is $\frac{1}{4}$ L, therefore, one quarter of the area of the upper part of the window 900 is aligned with the light-transmitting part, and the outdoor natural light can be penetrated.

In some embodiments, the height distance between one pair of positioning elements (the second positioning element 50*b* as shown in FIGS. 5A and 6A) and the bottom edge 902 of the window 900 is 40% to 60% of the height dimension of the window 900. Specifically, as shown in FIG. 5A to FIG. 6B, a height distance between the second positioning elements 50*b* and the bottom edge 902 of the window 900 is 50% of the height dimension of the window 900. In some embodiments, when the second positioning elements 50*b* are in the locked position, the adjusting rod 40 is positioned at a height level of the second positioning element 50*b*, in the case that the lower displacement of the falling element 60 relative to the adjusting rod 40 is greater than $\frac{1}{4}$ L and less than $\frac{1}{2}$ L, since the height level of the falling element 60 is higher than the bottom edge 902 of the window 900, a small lighting or ventilation space will be formed between the falling element 60 and the bottom edge 902 of the window 900 in the height direction, and at the same time, a certain degree of privacy is protected indoors. The height level of the junction 301 is lower than the top edge 901 of the window 900, and the distance between the junction 301 and the top edge 901 of the window 900 in the height direction is greater than zero and less than $\frac{1}{2}$ L. The light-transmitting section 31 is located between the top edge 901 of the window 900 and the junction 301 in the height direction, therefore, the outdoor natural light can enter the room through the light-transmitting section 31.

As shown in FIG. 5A, in the case that the lowering displacement of the falling element 60 relative to the adjusting rod 40 is equal to $\frac{1}{3}$ L, the falling element 60 is located above the bottom edge 902 of the window 900 by a distance of $\frac{1}{6}$ L. The junction 301 is located below the top edge 901 of the window 900 by a distance of $\frac{1}{6}$ L, therefore, two light-transmitting areas are formed in the upper and lower parts of the window 900 respectively, and the height dimensions of the two light-transmitting areas are equal and are both $\frac{1}{6}$ L. One of the two light-transmitting areas is adjacent to the top edge 901 of the window 900, and the other light-transmitting area is adjacent to the bottom edge 902 of the window 900, therefore, the middle of the window 900 remains shaded by a relatively small area.

As shown in FIG. 6A, in the case that the lowering displacement of the falling element 60 relative to the adjusting rod 40 is equal to ½ L, the height level of the falling element 60 is aligned with the height level of the bottom edge 902 of the window 900, at the same time, the lower part of the window 900 is completely shaded, and the distance between the junction 301 of the cord fabric 30 and the top edge 901 of the window 900 in the height direction is ½ L, therefore, one-half of the area of the window is aligned with the light-transmitting part, and more outdoor natural light can be penetrated.

In some embodiments, as shown in FIG. 8, a width of the penetrating slot 42 is greater than a thickness of the light-tight section 32. The falling element 60 is slidably disposed between the end edge 321 of the light-tight section 32 away from the light transmitting section 31 and the penetrating slot 42. Specifically, a width direction of the penetrating slot 42 is perpendicular to the length direction of the adjusting rod 40, and is substantially parallel to the horizontal plane. In some embodiments, the width of the penetrating slot 42 is about 3 mm.

Limited by a size of the penetrating slot 42, the falling element 60 cannot pass through the penetrating slot 42, and the falling element 60 is limited to one side of the adjusting rod 40. When the adjusting rod 40 is supported by the positioning elements (the first positioning elements 50*a* and the second positioning elements 50*b* as shown in FIG. 2, or the positioning elements 50 in FIG. 7A), the falling element 60 is located below the adjusting rod 40. In some embodiments, the falling element 60 is slidably surrounding an outer periphery of the light-tight section 32.

Figure 9A:
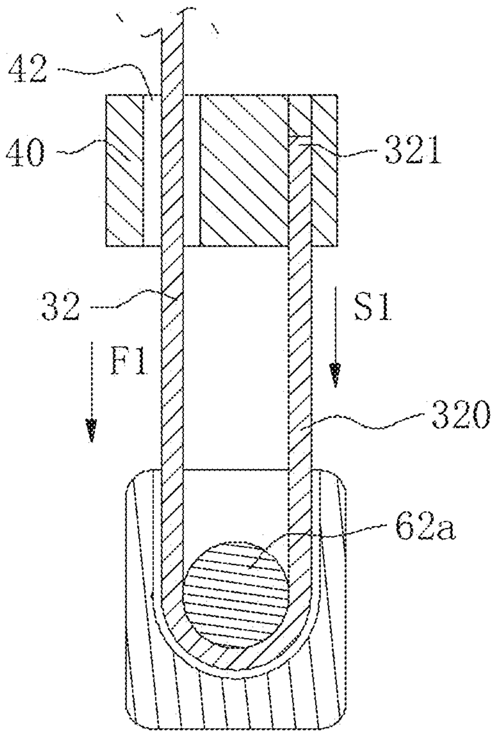
FIG. 9A is a partial structure view of a multi-mode up-down curtain according to another embodiment of the present disclosure.
Figure 9B:
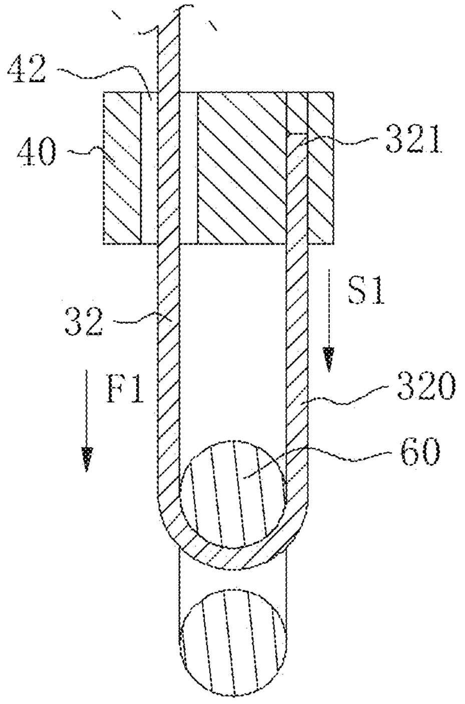
FIG. 9B is a partial structure view of a multi-mode up-down curtain according to yet another embodiment of the present disclosure.
Figure 10:
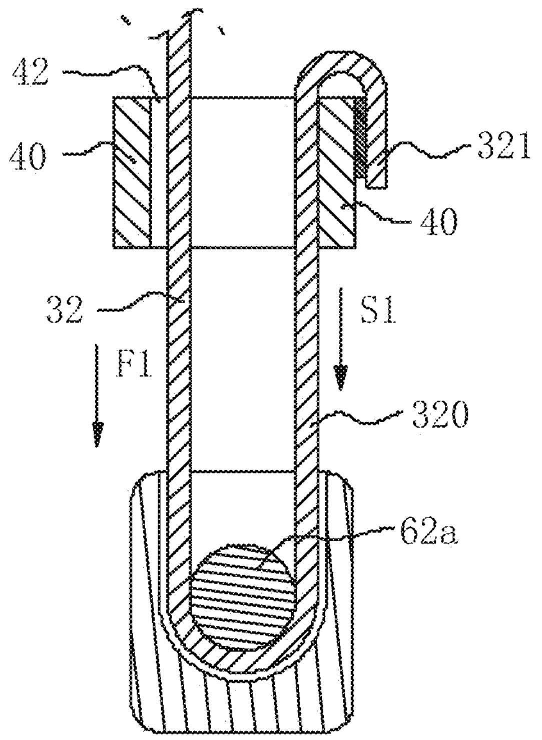
FIG. 10 is a partial structure view of a multi-mode up-down curtain according to yet another embodiment of the present disclosure.

In some embodiments, as shown in FIG. 10, a structure folded inside and outside the adjusting rod 40 is formed by the end of the light-tight section 32, and this part of the light-tight section 32 is in a form of being hooked on the adjusting rod 40 in cross section. In some embodiments, a part of the end of the light-tight section 32 is bonded with an outer side surface of the adjusting rod 40. In some embodiments, as shown in FIG. 9A and FIG. 9B, the end of the light-tight section 32 away from the light transmitting section 31 is fixedly clamped in the adjusting rod 40. In some other embodiments, the end edge 321 of the light-tight section 32 away from the light transmitting section 31 is fixedly connected to the adjusting rod 40 by nails or other fasteners.

In some embodiments, as shown in FIG. 8 and FIG. 9A, the falling element 60 includes a falling body 61 and a rolling contact element 62*a* rotatably connected to the falling body 61. The light-tight section 32 is movably threaded between the rolling contact element 62*a* and the falling body 61. In some embodiments, a weight of the falling body 61 is greater than a weight of the rolling contact element 62*a*. In the case that the roller 22 is rotated in the direction of releasing the cord fabric 30, and the adjusting rod 40 is loaded on the positioning elements, as the cord fabric 30 lowers, the falling element 60 slides downwardly under the action of gravity, and parts of the light-tight section 32 are threaded between the rolling contact element 62*a* and the falling body 61 in sequence to reach the other side of the rolling contact element 62*a*. As the light-tight section 32 is rotated around the outer periphery of the rolling contact element 62*a*, the rolling contact element 62*a* is rotated relative to the falling body 61 driven by the light-tight section 32, therefore, a rolling friction fit is formed between the rolling contact element 62*a* and the cord fabric 30, thereby reducing friction between the rolling contact element 62*a* and the cord fabric 30, and increasing duration of the cord fabric 30. In some embodiment, in the case that the light-tight section 32 is folded in the horizontal direction, the rolling contact element 62*a* is loaded on the light-tight section 32, and the falling body 61 is suspended below the light-tight section 32 through the rolling contact element 62*a*.

In some embodiments, as shown in FIG. 9A, the rolling contact element 62*a* is rod-shaped and is rotatably inserted into the falling body 61. In some embodiments, a bearing is provided between an end 41 of the rolling contact element 62*a* and the falling body 61. In some embodiments, as shown in FIG. 8, the rolling contact element 62*a* is sleeve-shaped and is rotatably mounted around an outer periphery of a rod-shaped component 621, and the rod-shaped component 621 is connected to the falling body 61.

In some embodiments, as shown in FIG. 8 and FIG. 9A, a recessed groove 611 is formed in the falling body 61. The rolling contact element 62*a* is accommodated in the groove 611. The groove 611 is formed between two width-limiting boundary surfaces 612 of the falling body 61. A distance between the two width-limiting boundary surfaces 612 is greater than an outer diameter of the rolling contact element 62*a*. Specifically, the width-limiting boundary surfaces 612 and the rolling contact element 62*a* are spaced apart from each other. Since the rolling contact element 62*a* is in the groove 611, when the light-tight section 32 is wound and passes through the outer periphery of the rolling contact element 62*a*, a distance between two overlapping parts of the light-tight section 32 in the horizontal direction is limited by the two width-limiting boundary surfaces 612. Therefore, a spacing between the two overlapping parts of the light-tight section 32 in the horizontal direction can be reduced, thereby making the cord fabric 30 more flat, helping the cord fabric 30 to maintain an excellent shape conforming the window 900, and ensuring the light-tight section 32 conforming the side of the window 900. In some embodiments, an opening of the groove 611 is formed between outer boundaries of the two width-limiting boundary surfaces 612.

In some embodiments, as shown in FIG. 9B, the falling element 60 is a single piece of a ring shape and surrounds the outer periphery of the light-tight section 32. Specifically, a sliding friction fit is formed between the falling element 60 and the surface of the light-tight section 32.

The above embodiments are merely to describe preferred embodiments of the present disclosure, not limited to the scope of the present disclosure. Any changes and variations made by those skilled in the art without departing from the spirit and scope of the present disclosure, should be fall into the protection scope of the claims of the present disclosure.

The invention claimed is:

1. A multi-mode up-down curtain, comprising:

a winding component, comprising a support element and a roller rotatably mounted on the support element;

cord fabric, entirely or partially wound around an outer periphery of the roller; and comprising a light-transmitting section and a light-tight section; wherein the light-transmitting section and the light-tight section are connected along a stretching direction of the cord fabric; and the light-tight section is arranged below the light-transmitting section along the stretching direction;

an adjusting rod, fixedly connected to an end of the light-tight section away from the light-transmitting section; and a middle part of the light-tight section slidably threaded through a penetrating slot of the adjusting rod; wherein as the cord fabric is lifted and lowered, the adjusting rod is movable along a lowering path, and the lowering path comprises an upper extreme position and a lower extreme position;

a falling element, slidably connected to a lower part of the light-tight section, wherein the lower part of the light-tight section is located between the penetrating slot of the adjusting rod and the end of the light-tight section away from the light-transmitting section; and at least one pair of positioning elements, each pair of the at least one pair of positioning elements being located at a stopping position between the upper extreme position and the lower extreme position of the lowering path of the adjusting rod, and each positioning element of the at least one pair of positioning elements comprising a locked position and an unlocked position, wherein, when the cord fabric is lifted, the falling element abuts against the adjusting rod and is lifted together with the cord fabric; and wherein when the cord fabric is lowered, and when the at least one pair of positioning elements is in the locked position, the adjusting rod is capable of being positioned at the stopping position by the at least one pair of positioning elements, at this time, the falling element is capable of being lowered continuously; and when the at least one pair of positioning elements is in the unlocked position, the adjusting rod is capable of passing over the stopping position.

2. The multi-mode up-down curtain of claim 1, wherein the at least one pair of positioning elements is slidably disposed between the locked position and the unlocked position; or the at least one pair of positioning elements is rotatably disposed between the locked position and the unlocked position.

3. The multi-mode up-down curtain of claim 1, wherein the at least one pair of positioning elements is rotatably disposed between the locked position and the unlocked position, and each positioning element defines a semi-open space with an opening orientation being adjustable by rotation.

4. The multi-mode up-down curtain of claim 3, wherein the semi-open space is entirely defined by a corresponding one of the positioning elements.

5. The multi-mode up-down curtain of claim 3, wherein the semi-open space is defined by a corresponding one of the positioning elements and an installation surface cooperatively.

6. The multi-mode up-down curtain of claim 3, wherein the semi-open space has boundary surfaces comprising two side displacement limiting boundary surfaces and a descent limiting boundary surface; the two side displacement limiting boundary surfaces are arranged opposite to each other; and the descent limiting boundary surface is arranged between the two side displacement limiting boundary surfaces.

7. The multi-mode up-down curtain of claim 1, wherein each pair of the at least one pair of positioning elements in the locked position is interfered with the lowering path of the adjusting rod.

8. The multi-mode up-down curtain of claim 1, wherein the at least one pair of positioning elements comprises two pairs of positioning elements, and the two pairs of positioning elements are distributed at different height levels along the lowering path of the adjusting rod.

9. The multi-mode up-down curtain of claim 8, wherein a height distance between one of the pairs of positioning elements and a bottom edge of a corresponding window is 20% to 30% of a height dimension of the corresponding window.

10. The multi-mode up-down curtain of claim 8, wherein a height distance between one of the pairs of positioning elements and a bottom edge of a corresponding window is 40% to 60% of the height dimension of the corresponding window.

11. The multi-mode up-down curtain of claim 1, wherein a width of the penetrating slot is greater than a thickness of the light-tight section.

12. The multi-mode up-down curtain of claim 1, wherein the falling element comprises a falling body and a rolling contact element rotatably connected to the falling body; and the light-tight section is movably threaded between the rolling contact element and the falling body.

13. The multi-mode up-down curtain of claim 12, wherein the falling body is provided with a recessed groove; the rolling contact element is accommodated in the recessed groove; the recessed groove is formed between two width-limiting boundary surfaces of the falling body; and a distance between the two width-limiting boundary surfaces is greater than an outer diameter of the rolling contact element.

* * * * *